Aug. 23, 1960    J. A. BERUMEN ET AL    2,949,655
METHOD AND APPARATUS FOR MAKING PRE-STRESSED
SPUN CONCRETE ARTICLES
Filed Feb. 11, 1957                          7 Sheets-Sheet 1
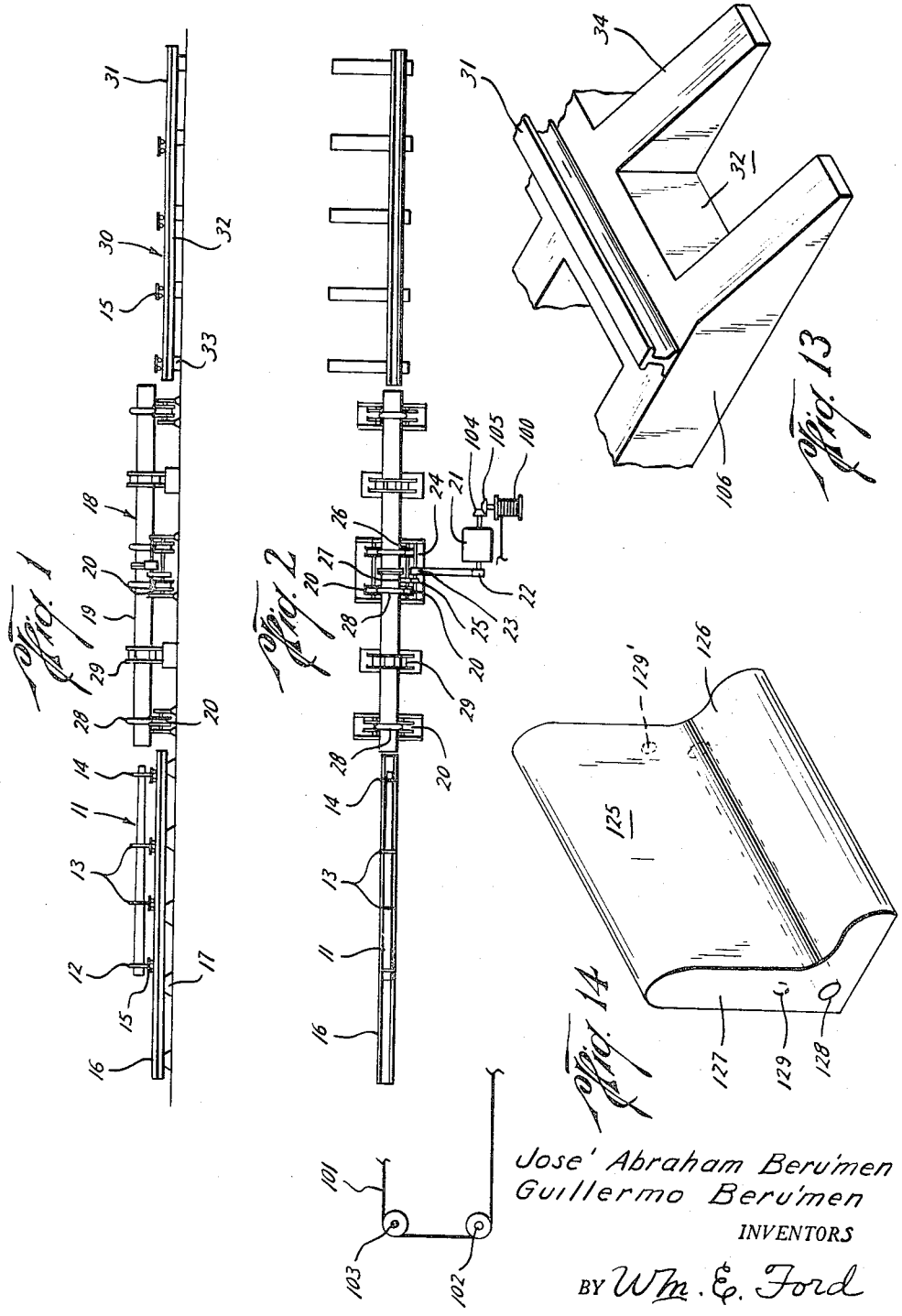
Jose' Abraham Berumen
Guillermo Berumen
INVENTORS
BY Wm. E. Ford
ATTORNEY

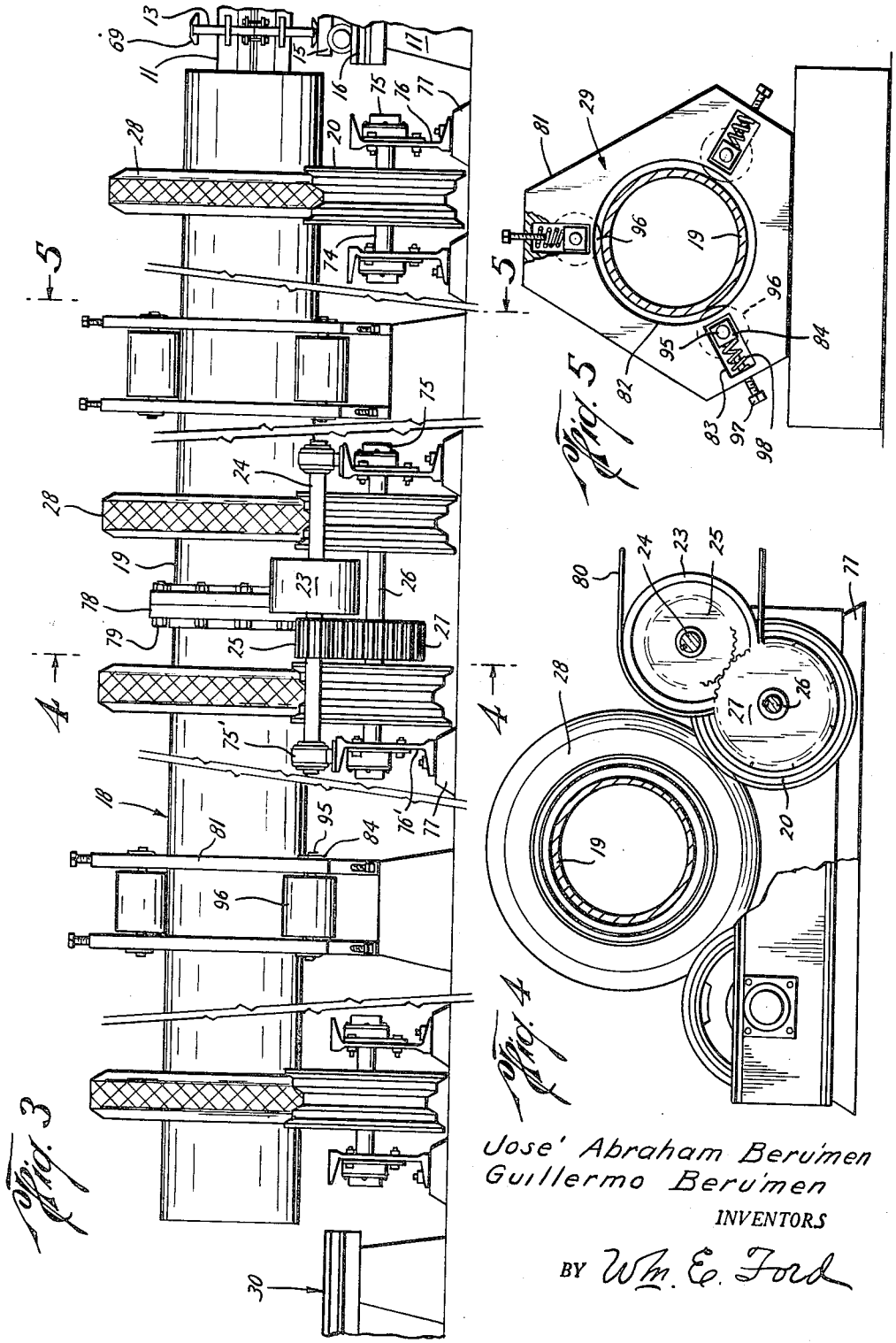

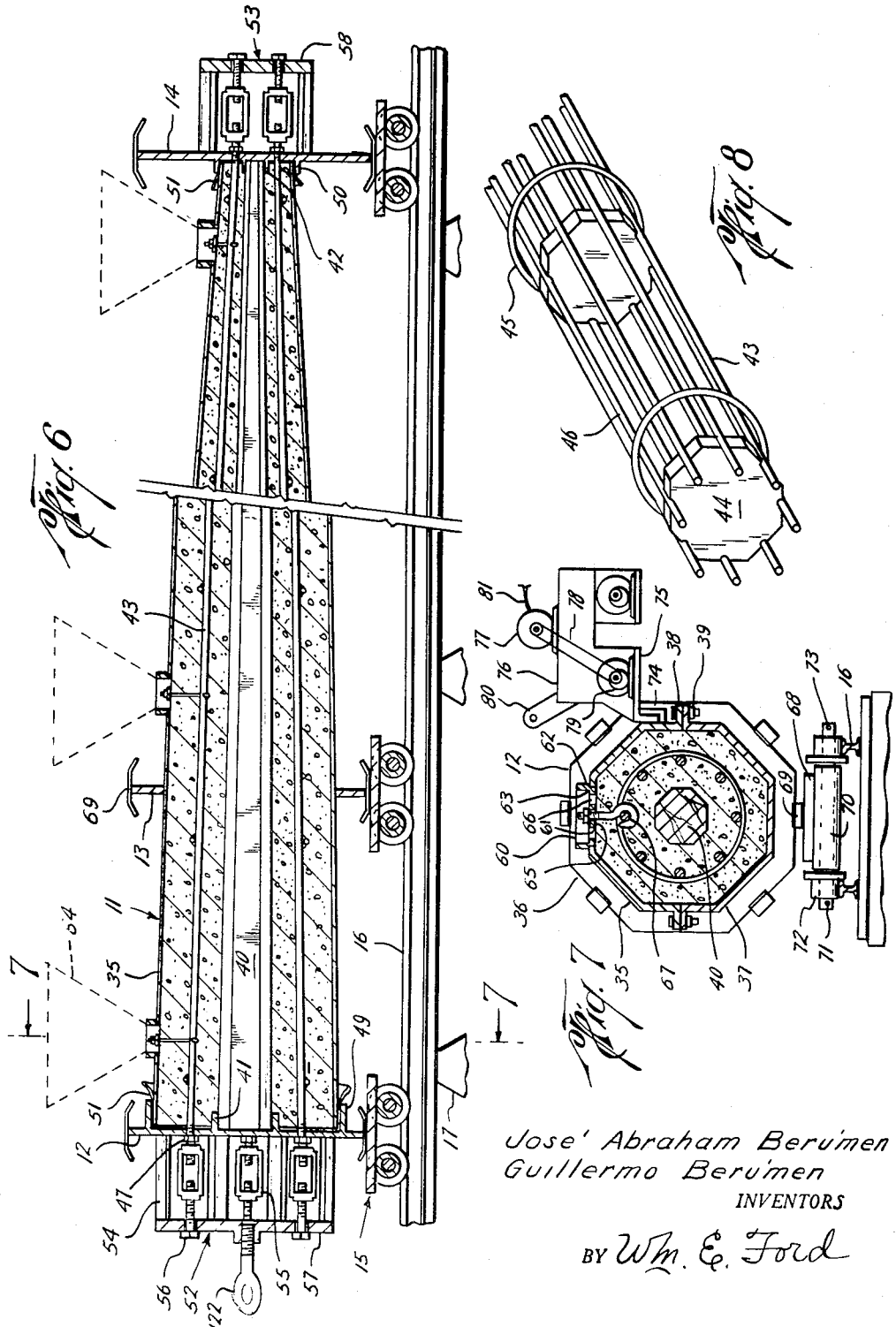

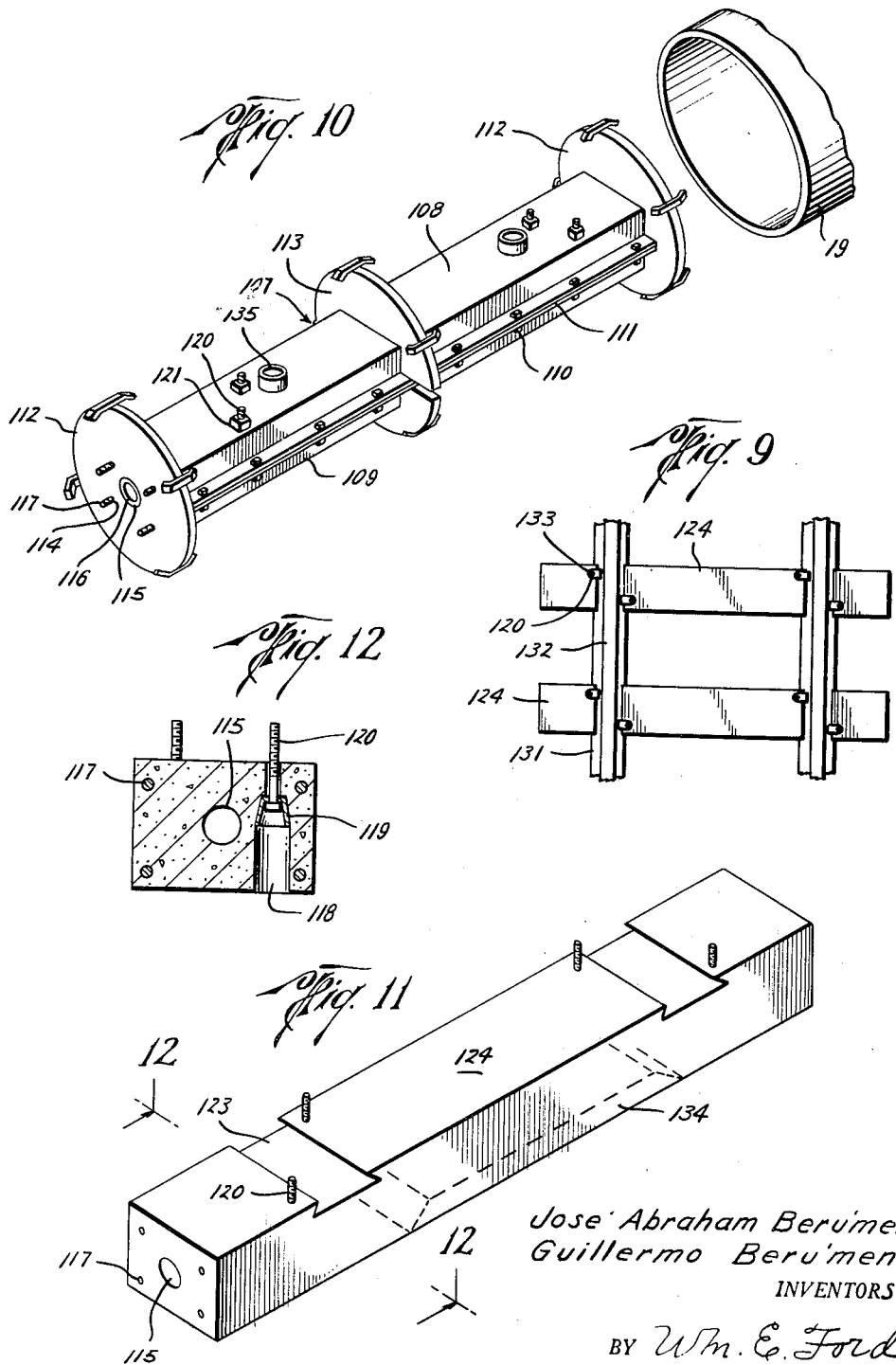

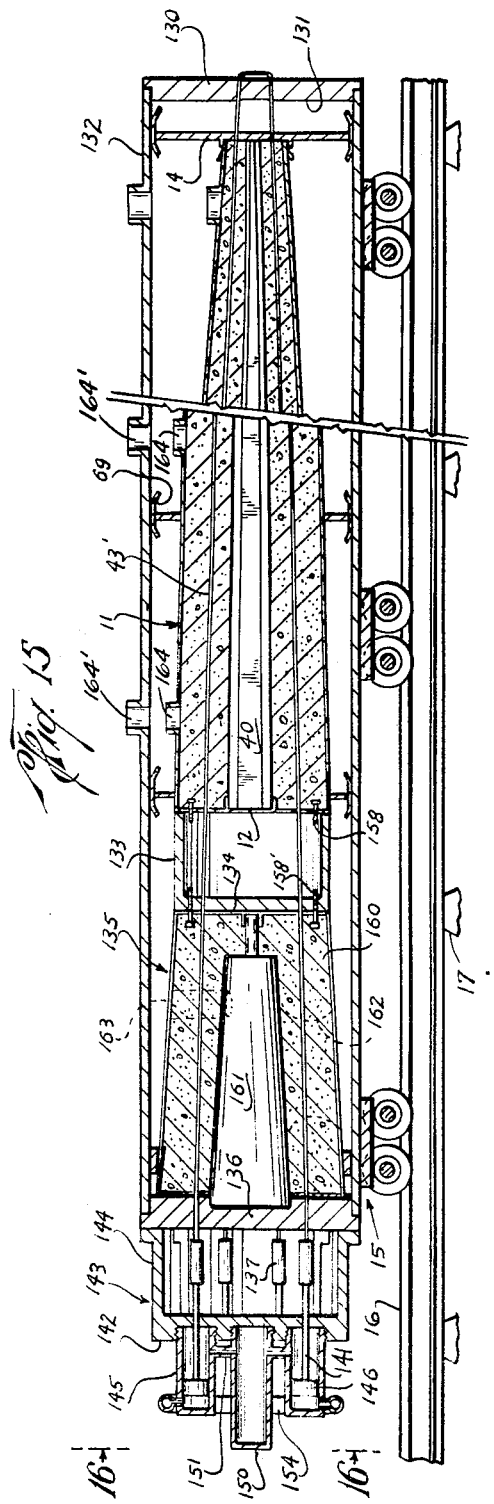

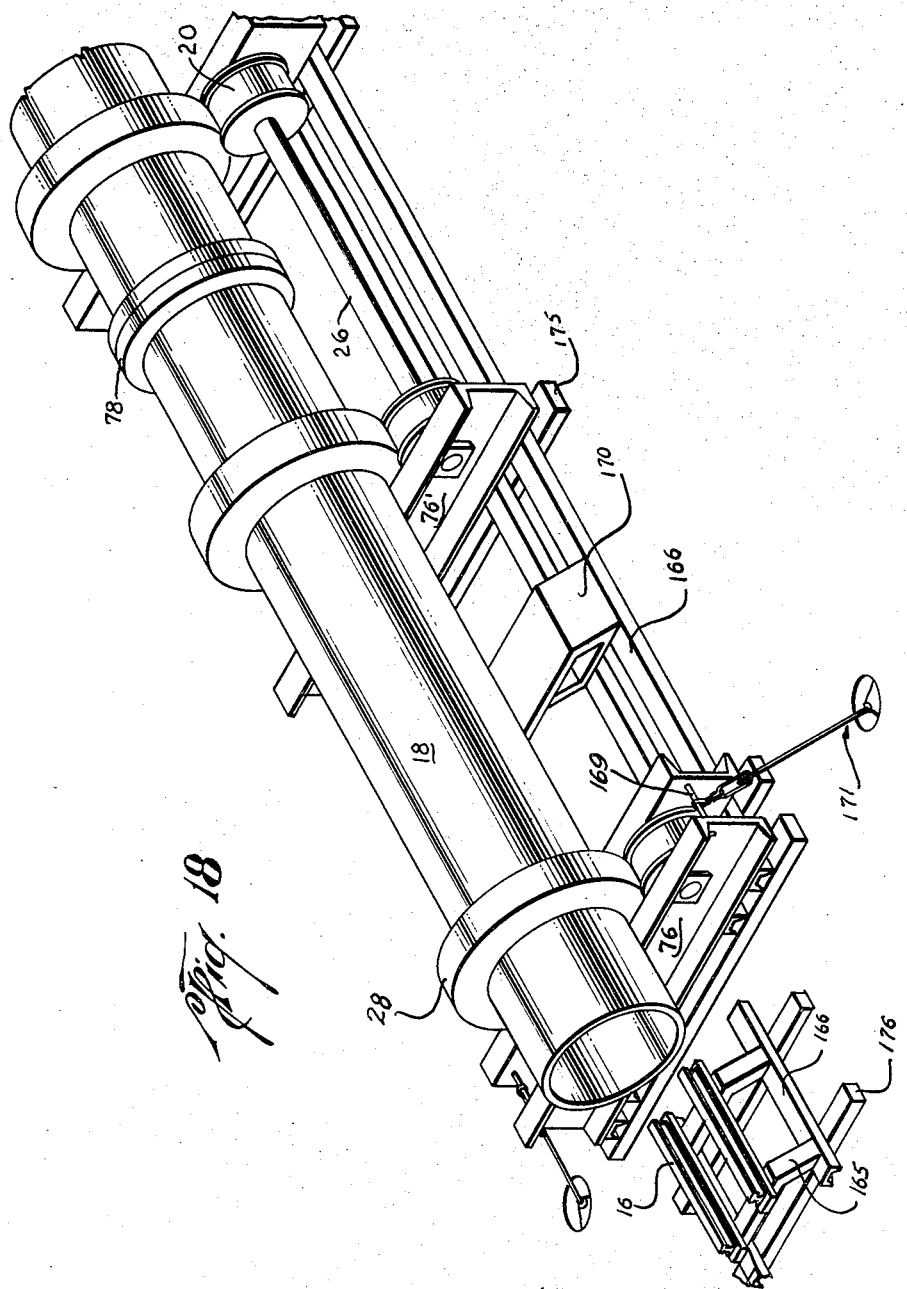

Aug. 23, 1960 J. A. BERUMEN ET AL 2,949,655
METHOD AND APPARATUS FOR MAKING PRE-STRESSED
SPUN CONCRETE ARTICLES
Filed Feb. 11, 1957 7 Sheets-Sheet 7
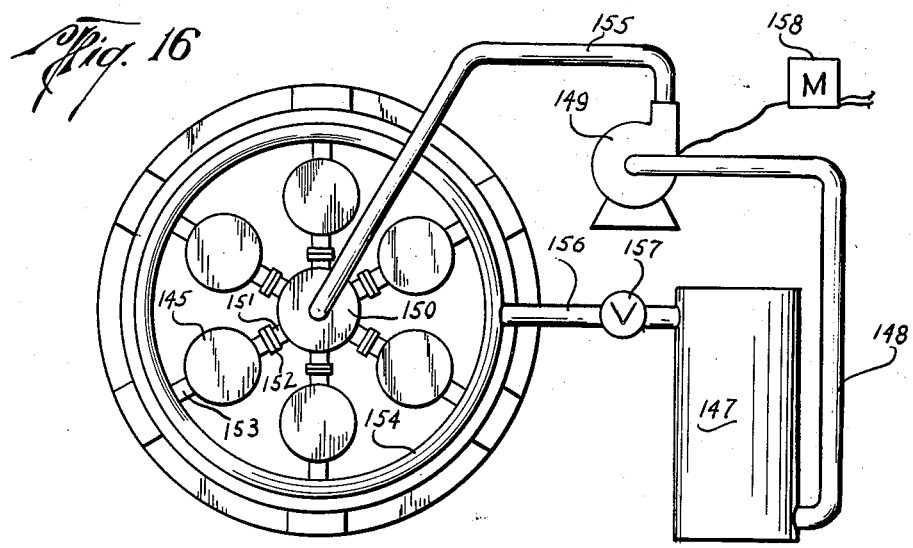
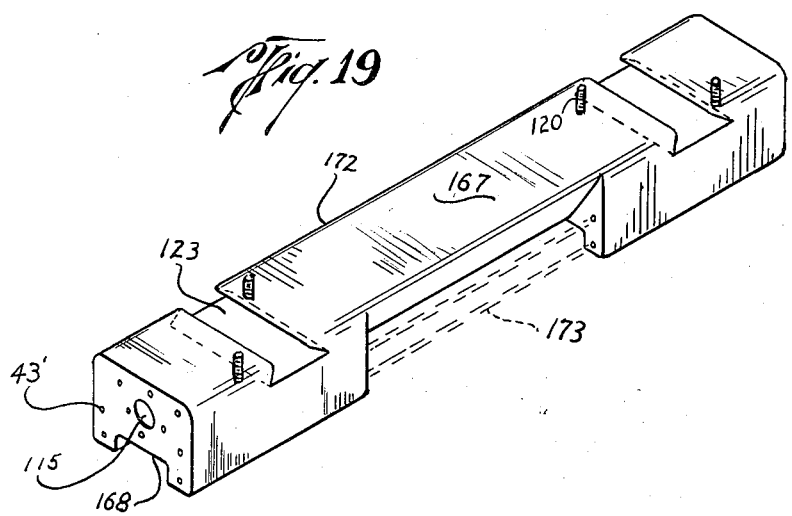
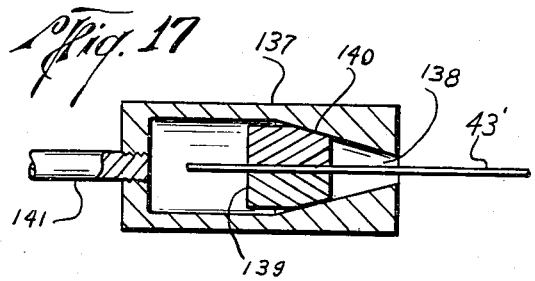
José Abraham Berúmen
Guillermo Berúmen
INVENTORS
BY Wm. E. Ford
ATTORNEY

United States Patent Office 2,949,655
Patented Aug. 23, 1960

2,949,655

METHOD AND APPARATUS FOR MAKING PRE-STRESSED SPUN CONCRETE ARTICLES

Jose A. Berumen and Guillermo Berumen, both of Calle Blanco 234 Sur, Torreon, Coahuila, Mexico Filed Feb. 11, 1957, Ser. No. 639,504

9 Claims. (Cl. 25—30)

This invention relates to an apparatus for prestressing reinforcing wires in a light inexpensive form without the form having to withstand the force of prestressing, the form being filled with concrete, spun in a rotating spinner and then removed from the spinner, so that the spun product may be removed from the form after the concrete has hardened therein to effect completion of a utile cast article, this application being a continuation-in-part application of United States Patent application Serial No. 615,929 for Vibratory Concrete Centrifuging Machine and Products Thereof filed October 15, 1956, now abandoned.

It is a primary object of this invention to provide a machine for making pre-stressed spun concrete articles which is adapted to spin concrete forms of a wide variety of shapes in a speedy manner, while at the same time insuring uniformity of the distribution of concrete therein.

It is also an object of this invention to provide a machine of this class in which the concrete is uniformly distributed in the created cast concrete article.

It is a further object of this invention to provide a machine of this class which may centrifuge articles of eccentric shape as well as articles of concentricity.

It is still a further object of this invention to provide a machine of this class which may centrifuge reinforced concrete articles with a minimum of the reinforcing appearing in the periphery of the article.

It is yet another object of this invention to provide a machine for forming and spinning concrete forms, as light poles and railroad ties in a speedy manner, and with inexpensive equipment, whereas the spun products are provided inexpensively to the trade and of requisite strength and durability.

It is a further and primary object of this invention to provide a machine of this class which includes equipment for enabling pre-stressing of the reinforcing wires or rods which extend through the forms, the forms being filled with concrete, the pre-stressing taking place against means other than the forms whereby the forms are protected from having to withstand the force of pre-stressing.

It is also a most important object of this invention to provide a machine and apparatus of this class which is portable and which may be readily installed and anchored on a portable base requiring a minimum of digging and foundation laying before putting the machine into operation at a new location;

Other and further objects will be apparent when the specification herein is considered in connection with the drawings in which:

Fig. 1 is an elevation of an embodiment of the invention;

Fig. 2 is a plan view of the embodiment shown in Fig. 1;

Fig. 3 is an elevation of the spinner comprising part of the embodiment shown in Fig. 1;

Fig. 4 is a sectional view taken along line 4—4 of Fig. 3;

Fig. 5 is a sectional view taken along line 5—5 of Fig. 3;

Fig. 6 is a longitudinal elevation of a form employed in the practice of the invention;

Fig. 7 is a sectional elevation taken along line 7—7 of Fig. 6;

Fig. 8 is a perspective view of a form employed in fabricating the reinforcing cage of the invention;

Fig. 9 is a plan view of railroad ties formed in the practice of the invention;

Fig. 10 is a perspective view of a railroad tie form;

Fig. 11 is a perspective view of a railroad tie formed in the practice of the invention;

Fig. 12 is a transverse sectional view of the railroad tie shown in Fig. 11;

Fig. 13 is a fragmentary perspective view of the unloading rack employed in the exercise of the invention;

Fig. 14 is a perspective view of a section of curb demonstratng the exercise of the invention in spinning articles which are not of concentricity;

Fig. 15 is a sectional elevation of a type of form employed wherein reinforcing wires may be pre-stressed to great tensile stress;

Fig. 16 is a transverse view, partially diagrammatic, taken along line 16—16 of Fig. 15;

Fig. 17 is a sectional elevation showing a type of chuck employable to grasp the pre-stressing wires or rods shown in Fig. 15;

Fig. 18 is a perspective view of a type of portable base and the foundation ties therefor whereby the machine apparatus of the invention may be transported for use in various localities; and Fig. 19 is a perspective view of a pre-stressed, re-inforced spun concrete railroad tie constituting an improvement on the cross-tie shown in Figs. 11 and 12.

Referring in detail to the drawings, the general arrangement of the invention is shown in Figs. 1 and 2. A form 11 has support rings 12, 13, and 14, which seat upon dollies 15 which roll upon a track 16 supported by foundation elements 17.

A spinner 18 includes a large cylinder or pipe 19 which has resilient drive collars preferably in the form of wheels or tires 28 thereon which contact wheels 20 so that the pipe 19 is thereby rotated, such wheels 20 being on either side of the pipe 19 and therebelow and being driven by a motor 21, which, through a belt 22, drives a pulley 23 on a drive shaft 24, a pinion 25 on the shaft 24 meshing with a gear 27 on one of the driven shafts 26 which support the wheels 20 for rotation. As shown, the arrangement of tire 28 and wheels 20 is provided near the ends of the spinner 18 as well as centrally thereof to provide a balanced drive with ample traction.

Since at great speeds of rotation the pipe 19 may tend to vibrate upwardly and depart or jump contact with the wheels 20, it is necessary to provide holddown or retainer rings 29 which encircle the pipe 19 at points spaced apart from the wheels 20. Thus, the tire supported pipe 19 is maintained in traction with the wheels 20 and restrained to rotation.

An unloading rack 30 receives the form 11 after it is spun, such rack comprising tracks 31 carried by a base 32 which rests upon foundation elements 33. Ramp elements 34 are provided at spaced apart points along the base 32 and slope downwardly therefrom as best shown in Fig. 13, whereby ease of unloading finished spun articles is assured.

The form construction must vary for various shapes and forms to be spun and the form shown in Figs. 6–8 is the form for a reinforced concrete pole, as a light pole. Such a pole is of octagonal cross-section and tapered from base to small end or top. The form 11 therefor includes the rings 12, 13, and 14 which are connected by the longitudinally extending side plates 35. The form is comprised of two sections 36 and 37, which have abutting flanges 38 connected by nuts and bolts 39.

In assembling the form 11, the end rings 12 and 14 are first set upon dollies 15 and oiled paper 51 employed to line the end plates within the flanges 49 and 50. Then the core 40 is inserted in the flanges 41 and 42 in the rings. A cage 43 of reinforcing rods 46 is then installed, such cage having been made by fitting the rods into form plates 44, then sliding rings 45 over the rods 46 and welding the rings 45 to the rods 46. In installation, the cage 43 is positioned around the core 40, the core 40 is fitted in the flange 41 and the ends of the rods are extended through holes in the end plate 12. Then the end plate 14 is installed, the ends of the rods 46 extending through holes in such end plate and the end of the core 40 being fitted into the flange 42 of the end plate 14. Then nuts 47 are installed on the threaded ends of rods 46 and the turnbuckle cages 52 and 53 are installed so that the legs 54 thereof bear upon the end plates 12 and 14, and the turnbuckles 55 thereof are connected to the ends of the rods 46, the turnbuckles in turn being supported by bolts 56 which extend from the cage plates 57 and 58. The turnbuckles may then be tightened to put desired tension in the rods 46, and after that the nuts 47 are threaded up against the end plates 12 and 14 to hold such tension.

Obviously, only one of the turnbuckle cages 52, 53 may be employed, in which case the nuts 47 on the rod ends at the end of the form not employing the turnbuckle cage, will serve as anchors to bind the rod ends against the end plate at such end while the turnbuckles are tightened.

To prevent the reinforcing rod cage 43 from sagging out of concentricity with the form, adapters 60 are installed in funnel openings 61 provided for the purpose of filling the form with concrete. Such an adapter shoulders at 62 on the form and provides an internal shoulder 63 to receive the end of a funnel 64. A central ring 65 having a bolt hole therethrough is connected to the body of the adapter 60 by spokes or a spider 66. A bolt 67 having a hook on the end thereof is connected to the cage 43 by engagement with a reinforcing rod 46, the head of the bolt extending through the ring 65, so that when a nut is tightened thereon, the cage 43 is supported by the bolt 67.

Concrete may now be poured through the funnels 64 to pass through the spiders 66 to fill the form, and after the form has been filled closures are inserted in the spiders. Then after the form has been spun and hardened, the closure is removed, then the nut may be removed from the bolt 67, the adapter 60 removed, and the head of the bolt 67 cut off flush with the surface of the concrete.

The dollies 15 disclosed in the drawings are of simple construction comprising a saddle or bed plate 68 on which rests a guide bar 69 of a support ring 12, 13, or 14, the bed plate in turn resting upon spaced apart sleeves 70, supported by an axle 71 on the ends of which wheels 72 are rotatable to move the dollie and load thereon down the trackways 16. Stop pins 73 hold the wheels 72 on the axle 71.

As the concrete is poured into the form through the funnels 64, it is agitated to obtain uniformity of distribution. To this end a plate 74 is affixed to the upper section 36 of the form to provide a pocket into which is inserted the lower leg of an angle 75 which supports a motor base 76 which carries a motor 77 thereon which through a belt and pulley connection 78 drives a rotor having an eccentric 79 thereon. Such a device is manually lifted into place, as by the handles 80 and the motor 77 is powered as by a portable electric line 81 to a source of electric power. Then, as the motor 77 runs and drives the eccentric 79, the agitation set up by virtue of this eccentricity causes a uniform distribution of the concrete. Although not shown, a second motor and agitator arrangement may be employed and manually placed in a similar pocket 74 on the opposite side of the form from the motor-agitator arrangement shown in Fig. 7.

As shown in Fig. 3, the form 11 is transported down the track 16 and into the spinner 18, and as a dollie 15 arrives at the end of the track 16 adjacent the spinner 18 it is removed and returned to the opposite end of the track for further use. As an optional system, the dollies may operate automatically to be tripped near the end of the track for automatic return upon a continuously driven chain arrangement as shown in Patent No. 2,692,565, issued October 26, 1954, to James D. Cummings for Pipe Conveyor System.

To insure entry and proper frictional contact with the inner periphery of the pipe the outermost or central parts of the guide bars 69 lie in imaginary cylindrical surfaces which are substantially in coincidence with the inner periphery of the spinner pipe 19 to form a sliding fit therein, while the outer parts of such bars are bent downwardly for guiding entry into the pipe.

The tires or wheels 28, which are tight in frictional engagement with the pipe 19 or otherwise fixedly connected thereto so as to carry the pipe 19 therewith in rotation, are driven by the wheels 20 the outer ones of which are mounted for rotation on shafts 74 which are supported by journal bearings 75 carried by support beams 76 mounted on base or foundation elements 77.

As shown in Fig. 3 the pipe may be assembled in sections by means of connecting flanges 78 on adjacent ends of abutting sections which are joined together by nuts and bolts 79 as shown. Thus, a pipe spinner of any desired length may be set up to accommodate forms of various lengths, in which case compensating adjustment of length can be made in the form tracks 16 and/or in the unloading rack 30.

A gear 27, as hereinabove described, is mounted on the shaft 26 which also carries the central wheels 20 which engage the central tires 28. The shaft 26 is journalled for rotation in journal bearings 75 in support beams 76' and mounted on such beams are the journal bearings 75' in which is journalled the shaft 24 which carries the pinion 25 to mesh with the gear 27, and also carries the pulley 23 which is driven by the belt 80 driven from the pulley 22 on the shaft of the motor 21. In this manner, the motor rotation carries through in traction to the tires 28.

Since the speeds of rotation thus attainable can be quite excessive, it is necessary to restrain the pipe 19 from flying upwardly and out of contact with the wheels 20 due to the excessive speed developed. To this end the hold-down assemblies 29 are provided at spaced apart intervals between wheels 28. Such hold-downs comprise pairs of spaced apart frames 81 which have circular openings 82 therein through which the spinner pipe 19 is passed in assembly.

A plurality of slots 83, of rectangular cross-section, and spaced apart at equal angles, as 120° with relation to the center of the pipe, receive therein journal blocks 84 of rectangular cross-section to move slidably within the slots 83, and such blocks 84 have journalled therein the ends of shafts 95 on which are mounted the hold-down wheels 96. A guide and adjustment bolt 97 is threadable from the frame 81 periphery to pass axially into the outer part of each slot to serve as a guide for a spring 98 therearound which bears inwardly against the journal block 84 and outwardly against the outer side of the slot. Thus, there is provided a means which will restrain the tires 28 from flying out of traction with the wheels 20 in response to excessive centrifugal force operative thereupon, and at the same time allowance is made for the lesser effects of centrifugal force and vibration to permit limited movement of the pipe 19 out of the normal axis of the machine which must pass through the centers of the wheels 28 when at rest and also through the centers of the wheels 96 as when such are at rest.

After the concrete filled form has been spun for a sufficient time to properly centrifuge the contents, such length of time being determined by the article to be spun, the concrete constituency and other influencing considerations, the form is forced from one end or pulled from the other end of the spinner pipe 19 as the case may be. For this purpose, a conventional winch 100 may be provided, preferably to pull from the unloading rack end, the winch cable 101 thereof connecting to the form, as to the turnbuckle cage 52, and extending over pulleys 102 and 103 in snatch-block arrangement, while the winch 100 for convenience and utilization of power is driven from the shaft of the motor 21, the drive connection being shown diagrammatically by the bevel gears 104, 105 on the motor and winch shafts respectively.

The unloading rack 30, shown in Figs. 1 and 2 and in fragmentary detail in Fig. 13, comprises a concrete frame 106 including the ramp elements 34, and longitudinal base elements 32 to carry parallel extending tracks 31.

As the form rings 12, 13, and 14 successively emerge from the spinner pipe 19, dollies 15 are placed thereunder to support the form upon the tracks 31. When fully withdrawn, the form of spun concrete is allowed to settle and harden for a proper time element before being removed from the unloading rack 30. Optionally the unloading rack may lead into a treatment chamber, where processes, as steam drying, may be employed. In any case, various unloading means are adapted to be employed in unloading, as fork lifts and the like, and the forms may be removed prior to unloading or thereafter as the case may be.

A special product which may be manufactured by the equipment and method of the invention is that of railroad ties. As is well known, such ties, as now generally provided, are made of creosoted wood, which becomes scarcer and scarcer and more costly of procurement with the depletion of our great forests, also, there is always the cost of transportation from the lumber country to creosoting yards and then to situs of use.

The invention is particularly adapted to spin or centrifuge concrete railroad ties at localities approximate the place of use of the ties, at lower costs of production, and at minimized labor costs. As shown in Figs. 9–12 such a railroad tie and a form employed in its use is shown. The form 107 is shown in Fig. 10 and includes an upper section 108 of substantially inverted U-shaped cross-section, and a lower section 109 of substantially U-shaped cross-section, such sections being joined by nut and bolt connections 110 connecting abutting flanges 111 on such sections.

End closures 112 are provided, and also center rings 113. Such end plates have holes 114 therein spaced radially apart around a central or core opening 115. Prior to assembling the upper and lower sections 108, 109, cores are set up and affixed to upstand in the lower section 109 to set up the openings 118 therein, such cores being capped with bolt retainer caps 119 and to support the heads of bolts 120 which upstand and extend upwardly through the caps 119.

Then the upper section 108, having cores 123 therein of the shape of the openings 123 in the cross-tie shown in Fig. 11, is installed to receive through openings therein the ends of the bolts 120, and nuts 121 are installed on the ends of such bolts to thus further hold the bolts 120 in position. Then the flanges 111 may be connected to complete the assembly of the sections 108, 109.

After this, the core 116 and reinforcing rods 117 are inserted through the sections 108, 109 and into the respective openings 115, 114 therefor in the end plates 112, such end plates being positioned with relation to the sections 108, 109, as by insertion into receiving indentations in such end plates. Then, obviously turnbuckle cages 52 or 53, or both, may be installed on the end plates 112 and the reinforcing rods 117 set under tension as hereinabove described for the light pole construction shown in Figs. 6–8.

After this, motor-agitator assemblies 77, 79 may be installed in suitable pocket plates 74, not shown, but located to afford maximum agitation on the sides of the form 107. Then the filler openings 135 may have suitable closures installed therein and after that the form 107, supported on dollies 15 on the form tracks 16, may be drawn into the spinner pipe 19 to be spun, and to this end, for instance, cable connection may be made to the connecting ring 122 in the center of the turnbuckle cage 53. As the form is drawn into the pipe, the guide bars 69 act upon entry as guides and then as friction elements as they bind the inner periphery of the spinner pipe 19 to prevent axial movement therein during spinning.

After spinning in the spinner or centrifuge 18 for the desired time followed by settling, the form 107 can be removed, including the cores 118 and 123, and also the core 116 as desired, and the reinforcing rods shortened as shown with the results that a railroad tie 124 is provided, having wedge-shaped openings 123 to receive wedge-shaped wooden or filler blocks 30, as desired, or optionally to receive directly the lower or wider flange 131 of a conventional railroad rail 132. After this, conventional hold-down clamps 133 are installed on the bolts 120 to affix the ties 124 to the rails 132.

As an optional feature, an additional core 134 may be provided in the lower section 109 of the shape indicated in dotted lines in Fig. 11, so that when the railroad tie is spun and settled and the form removed, the central lower indentation in the concrete cross-tie renders it of a shape to better withstand the constant vibration of railroad cars thereover.

The invention is adapted for employment to spin shapes which are not concentric about an axis which naturally extends centrally of a machine. In such a case, a form may be provided with end plates adapted to connect the form with the form end plates at either end thereof in a manner that the axis of connection passes through the longitudinal center of gravity of the object to be spun in the pipe spinner 18. This is illustrated diagrammatically in Fig. 14 where a curb 125 is shown having a gutter flange 126 or a shorter length and an upright 127 or a longer or taller length. Such may also have a cored hole 128 to provide a passage through which plumbing or conduit wires may be extended. To accomplish this, connection is made between end closures of the curb form and the centers or axes of the form end plates, as indicated diagrammatically at 129, 129', such connection being made so that when the form is in place for spinning in the centrifuge pipe 19, the axis of rotation of the curb form coincides with the longitudinal axis of the spinner 18.

The method of form construction hereinabove disclosed follows the general pattern of providing a form assembly to sustain the necessary cores in place, and to pre-stress the reinforcing rods and assemblies employed to reinforce the end products to be formed. Such forms also provide a means of supporting such reinforcements when of considerable length, and also provide means to fill the forms and to support form agitators during filling, and provide for the insertion of closures to be inserted in the filler openings during spinning or centrifuging. In all cases, the form rings which frictionally grasp the interior of the spinner pipe, operate against a larger periphery than the extension of any structure therefrom so that there can be no interference with pipe entrance or operation in spinning. A special feature of form construction provides for sufficient looseness of assembly or the provision of small drain outlets to provide for the escape of excess water from the concrete aggregate during agitation and/or during centrifuging.

The spinner construction is susceptible to variation as to drive and as to hold-down, and the pipe interior may be adapted in cases to cooperate with the form to receive a non-circular shape in the absence of the circular form rings. However, in all cases the general purpose construction provides for a rotary element to receive the form therein and rotate it at a high rate of speed.

The settling period on the unloading rack may be varied as required, and the unloading rack and also the unloading equipment to transfer the completed article may be varied and may include additional process, as drying equipment.

Also, a wide variety of articles may be fabricated with the equipment generally considered since the light pole and cross-tie of concentricity about a longitudinal axis, and the curb of eccentricity in transverse cross-section about such axis, are only samples of the objects to be fabricated.

Also, the equipment required is adapted to be made portable and transported to various locations and set up in cooperative assembly at such locations.

In the form of the invention shown in Figs. 15, 16, and 17, reinforcing wires may be pre-stressed in a form, either before or after the form is agitated and filled with concrete, and in a manner that the form does not have to withstand the strain imposed in pre-stressing.

In Fig. 15 a light pole form 11 is shown corresponding to the form shown in Fig. 6 and having reinforcing rods or wires 43' of great strength capable of withstanding great stresses of say 200,000 pounds per square inch. Such rods are shown as passing at one end through the end support ring 14 and then through an end plate 130 which has an inner turned down portion 131 to fit within the end of a pipe 132. The rods 43' are then shown as re-curved to pass back through the end plate 130 and through the end support ring 14. The longitudinally extending lengths of the rod 43' extend through the form 11 and out through the other end support ring 12 and extend through a spacer 133 and through the top 134 of a foundation block form 135 and outwardly from the outer end of such form through an end plate 136 to be grasped by chucks 137 which may be of conventional design or as shown in Fig. 17.

Each wire or rod 43' extends through an end opening 138 in a chuck 137 and into a cylindrical opening complementally formed by a bore through complemental slip segments 139 with outer surfaces complementally forming a frusto-conical surface to fit in the counter-sunk, frusto-conical, or tapered surface 140 within the chuck 137. The slip segments 139 do not together form a complete circle in transverse cross-section therethrough by virtue of there being a longitudinally extending separation or opening between segments.

A piston rod 141 is threadedly connected to each chuck 137 and extends through the top 142 of a chuck cage 143 which has legs 144 peripherally spaced apart about the cage to bear upon the end plate 136, leaving access openings between each leg to permit operative access to the chucks 137. Each piston rod 141 extends into a cylinder 145 and has a piston 146 thereon to slide in the cylinder 145.

As shown in Fig. 16 fluid from a fluid filled reservoir 147 is drawn through a conduit 148 from the bottom of the reservoir or tank 147 by a pump 149 drawn by a motor 158 and such fluid is discharged therefrom through a discharge line 155 into a central or manifold cylinder 150. From the manifold cylinder 150 fluid passes outwardly through nipples 151 connected by unions 152 into the lower end of such cylinder 145. Conduits 153 extend from near the tops of each cylinder 145 to a manifold ring 154 from which a return conduit 156, having a valve 157 therein, returns fluid to the reservoir 147.

Thus when the pump 149 is started with the valve 157 open, the fluid lifts each piston 146 and stretches each wire rod 43' substantially a like amount and the internal structure of the steel rod undergoes the reaction necessary to bring it to the condition termed "pre-stressed," the tensile strength thus attained approaching 200,000 pounds per square inch. Since often the wire rods capable of attaining this strength have been hardened prior to pre-stressing to such hardness as not to permit threading; the slip segments 139 as shown in Fig. 17 are necessary to grasp each wire more and more firmly as the outward movement of the pistons move outwardly the chucks 137 connected to the piston rods of the pistons.

In the above described modification of the invention the provision of the spacer 133 makes it possible to centrifuge both a light pole and its foundation or base in a single operation. This is possible since the spacer 133 takes the place of the access or connection box, usually of metal, in which a transformer is usually installed to transform alternating to the direct current usually required in lighting systems. Anchor bolts 158 and 158' are provided to extend respectively through the support ring 12 of the light pole form and through the top 134 of the foundation form 135 and the top of the spacer 133 so that when the forms and spacer are removed after centrifuging connection may be made to such access box by passing the anchor bolts 158 and 158' respectively through holes in the top and bottom thereof and tightening nuts on the threaded ends of the anchor bolts to bear respectively against such top and bottom.

The foundation form 135 and foundation base 160 therein may be of frusto-conical or tapered polyhedral shape having a core 161 therein to seat in the end plate 136 and such core may be centered with relation to the top 134 of the foundation form as shown in Fig. 15. Lateral lightening and binding holes 162 are provided in spaced apart relation around the foundation base 160 as will be hereinafter described. An access opening 163 is provided in the foundation base 160 to provide for entry of electrical conductors and the like, to be passed therefrom through the cored opening and a smaller opening left in the top of the foundation base 160 upon removal of the centering pipe 164 with the core 161.

A base 160 is installed in a cylindrical hole drilled in the ground of as great or greater diameter than the bottom of such base and the base is inserted in such hole with bottom thereof to seal in the bottom of the hole. Then, to secure permanency of installation a conduit may be connected into the access opening 163 to extend from such drilled hole, and then the hole may be filled with concrete, a portable agitator being employed to distribute the poured concrete so it will fill the space of the openings 162 and the core space 161 as well as the space surrounding the foundation base.

The option resides of concrete filling and agitating the forms 11 and 135 prior to pre-stressing or after pre-stressing in which latter case funnel receptacles 164' are provided in the pre-stressing pipe 132 above the funnel receptacles 164 in the form 11. Although not shown, such receptacles 164' must also be provided in the pre-stressing pipe 132 above receptacles, also not shown, in the foundation base form 135.

The pre-stressing pipe 132 with the forms 135 and 11 therein, and with the pre-stressing assembly including chuck cage 143 and hydraulic assembly, may be inserted in the spinner pipe 18, but in such case support rings and friction shoes 69 similar to the friction shoes 69 shown on the forms 135 and 11 in Fig. 15 would be provided on the pre-stressing pipe 132 to frictionally engage the inner periphery of the spinner pipe 18, in which case a larger spinner pipe 18 would be required than required for the operation disclosed in Fig. 3.

Both the apparatus employed in Figs. 1–8 and 13 and the apparatus disclosed generally in Figs. 15–17 may be made portable by providing base structures as shown in Fig. 18 in which the track 16, and the track 16', not shown, are designed to be supported by support bridges 165 transversely thereunder, which are supported in turn by longitudinally extending, inverted channels 166.

As regards spinner assembly 18, the channels 76 and 76' which support the drives for the rollers or tires 28, and the supports 170 for the hold-downs 29, may also be connected to longitudinally extending channels 166. In the case of the track 31 for the unloading rack, the members 106 thereof may have plates connected therebeneath by anchor bolts, and these plates in turn may be connected to longitudinally extending channels 166.

Alternately, the support base 32 for the track 31 may be constructed of structural steel members instead of concrete, and the bottom thereof connected to longitudinally extending channels 166. A cross-pin 169 is provided between the channels 76, as shown in Fig. 18, and conventional earth anchors 171 are connected thereto operative upon the principles of the earth anchor shown in Patent No. 2,121,757, issued June 1, 1938 to W. A. Heinrich, et al for Earth Anchor.

Suitable transverse members 175 and 176 are provided as shown in Fig. 18 to be embedded in the earth as foundation elements, such members corresponding in general to conventional inexpensive cross-ties. These transverse members may be embedded in advance of the arrival of the centrifuging equipment and they are installed in a manner that their top surfaces are aligned and leveled to the same horizontal plane.

As a product alternative to the railroad tie 124, an improved railroad tie 167 may be provided having an inverted trough 168 under the outer portions thereof which support the rails over which the wheels of railroad cars roll. This type of railroad tie provides at each end a cored opening 123 therein of the general configuration shown in Fig. 11 to receive a wooden block therein which in turn may support an insulated metal support plate immediately below the rails. Thus the impact of the passage of railway rolling stock thereover is minimized in degree of vibration and the electrical circuitry connected with train passage is properly insulated. Also the inverted trough minimizes vibration and provides an initial configuration corresponding to the configuration conventional wooden cross-ties of initial rectangular cross-section may be expected to assume after usage. The railroad tie form is so constructed as to provide that all corners are rounded and no surfaces come together at sharp angles.

The central part 172 of the railroad tie is of substantially V-shape or modified V-shape construction for ease of installation and removal, and to lend a degree of flexibility to the tie. On the other hand reinforcing rods or wires 43' are provided as shown to lend strength to the tie. During pre-stressing the wires in the lower outer parts thereof, which provide the sides of the trough, have central portions 173 which extend externally of the tie defining form structure. Later when the wires have been pre-stressed the central parts thereof may be cut away, as by a cutting torch, to leave free the central space traversed by these wires for ease of installation in the earth of a railroad track bed, while at the same time the outer portions of the tie, which withstand the vibration and impact of railroad train passage thereover, are reinforced by these additional lengths of pre-stressed reinforcing wire rods.

For lightness, and to gain added flexibility, a core is employed in this type of railroad tie, as in the case of the tie provided in Fig. 11, so as to provide a cored central opening 115. Reinforcing rods to be pre-stressed, other than those indicated by the dotted lines in Fig. 19, are spaced about this cored hole 115, as shown in Fig. 19, and such pass through the whole length of the tie to add greatly to the strength thereof.

The structures and processes of this invention are susceptible to numerous variations and modifications. For instance, a chuck cage and hydraulic system may be installed at both ends of the form shown in Fig. 15 and pre-stressing carried out to extend or stretch the wire rods 43' in both directions in which case such wire rods would not be recurved as shown in Fig. 15. Also a multiplicity of forms may be centrifuged in one spinner pipe as well as more than one type of form may be pre-stressed in one pre-stressing pipe 32 as shown in Fig. 15.

The apparatus structures shown, and the products fabricated by such apparatus, and also the various method steps and procedures in the employment of the apparatus and in the production of various products are not delimiting disclosures, but other variations of structure, of products, and of procedures are included as well as such may fall within the broad spirit of the invention and within the broad scope of interpretations claimed and merited for the appended claims.

What is claimed is:

1. Apparatus for forming an article of concrete containing elongated prestressed reinforcing means which comprises: an assembly for maintaining tension in elongated reinforcing means, said assembly including a pair of spaced apart retaining means and elongated compressive-load-bearing means extending between and connected to said retaining means to resist inward movement thereof, said retaining means including connections for the ends of said reinforcing means to maintain said reinforcing means in tension; a light generally tubular form for containing concrete extending between said retaining means to surround said reinforcing means, said form being closed and having an inlet for concrete and an axis generally codirectional with said load-bearing means; means connecting said form to said assembly to restrict relative rotation therebetween about said axis, said form being substantially free of longitudinal-load-transferring connection to said assembly along the sides and at least one end of said form when said assembly is compressed under the pulling force of said reinforcing means so that substantially none of said force is transferred to said form; said load-bearing means transmitting substantially all of said force between said retaining means; said assembly and form comprising a unit rotatable about the axis of said form; and means connected to said unit to rotate said assembly and form about said axis to centrifuge the concrete while said assembly is maintaining tension in said reinforcing means.

2. Apparatus as recited in claim 1 wherein said rotating means comprises a tubular spinner and spacer means mounted on said load-bearing means to position said rotatable unit within said spinner with said spacer means frictionally engaging said spinner and retaining said unit coaxial with said spinner.

3. Apparatus as recited in claim 1 wherein there is provided means connected to said form to agitate said form as it is being filled with concrete.

4. Apparatus as recited in claim 1 wherein said form comprises a plurality of form sections, and spacer means are provided between the form sections to space said sections apart longitudinally, the reinforcing means extending continuously through said spacer means and through said form sections.

5. Apparatus for forming an article of concrete containing elongated prestressed reinforcing means which comprises: an assembly for maintaining tension in elongated reinforcing means, said assembly including a pair of spaced apart retaining means and generally tubular compressive-load-bearing means extending between and connected to said retaining means to resist inward movement thereof, said retaining means including connections for the ends of said reinforcing means to maintain said reinforcing means in tension; a light generally tubular form for containing concrete, said form being closed and having an inlet for concrete, said form extending between said retaining means coaxially within said tubular-load-bearing means to surround said reinforcing means; means connecting said form to said assembly to restrict relative rotation therebetween about the axis of said form, the inside dimensions of said load-bearing means being larger than the corresponding outside dimensions of said form, said form being substantially free of longitudinal-load-transferring connection to said assembly along the sides and at least one end of said form when said assembly is compressed under the pulling force of said reinforcing means so that substantially none of said force is transferred to said form; said load-bearing means transmitting substantially all of said force between said retaining means; said assembly and form comprising a unit rotatable about the axis of said form; and means connected to said unit to rotate said assembly and form about said axis to centrifuge the concrete while said assembly is maintaining tension in said reinforcing means.

6. Apparatus for forming an article of concrete containing elongated prestressed reinforcing means which comprises: an assembly for maintaining tension in elongated-reinforcing means, said assembly including a pair of spaced apart retaining means and elongated compressive-load-bearing means extending between and connected to said retaining means to resist inward movement thereof, said retaining means including openings extending therethrough to receive said reinforcing means and including connections for the ends of said reinforcing means to maintain said reinforcing means in tension, at least one of said retaining means including means to apply a pulling force to the ends of the reinforcing means which extend through the openings in said one retaining means, the other ends of the reinforcing means being anchored by the other retaining means; a light generally tubular form for containing concrete extending between said retaining means to surround said reinforcing means, said form being closed and having an inlet for concrete and an axis generally codirectional with said load-bearing means; means connecting said form to said assembly to restrict relative rotation therebetween about said form axis, at least one end of said form being spaced from the retaining means at that end of said form, said form being substantially free of longitudinal-load-transferring connection to said assembly along the sides and said one end of said form when said assembly is compressed under the pulling force of said reinforcing means so that substantially none of said force is transferred to said form; said load-bearing means transmitting substantially all of said force between said retaining means; said assembly and form comprising a unit rotatable about the axis of said form; and means connected to said unit to rotate said assembly and form about said axis to centrifuge the concrete while said assembly is maintaining tension in said reinforcing means.

7. Apparatus as recited in claim 5 wherein said form is asymmetrical about its axis and is mounted with its longitudinal center of gravity coincident with its axis.

8. Apparatus for forming an article of concrete containing elongated prestressed reinforcing means which comprises: an assembly for maintaining tension in elongated reinforcing means, said assembly including a pair of spaced apart retaining means and elongated compressive-load-bearing means extending between and connected to said retaining means to resist inward movement thereof, said retaining means including connections for the ends of said reinforcing means to maintain said reinforcing means in tension; a light generally tubular form for containing concrete extending between said retaining means to surround said reinforcing means, said form being closed and having an inlet for concrete and an axis extending in the same general direction as the reinforcing means extends when in tension; said form being substantially free of axial-load-transferring connection to said assembly when said assembly is compressed under the pulling force of said reinforcing means so that substantially none of said force is transferred to said form; said load-bearing means transmitting substantially all of said force between said retaining means; said retaining means and form comprising a unit rotatable about said form axis while said assembly is maintaining tension in said reinforcing means; and means connected to said unit to rotate said unit about said axis to centrifuge the concrete.

9. Apparatus as recited in claim 8 wherein said rotating means comprises a generally tubular spinner connected to said unit to support said assembly in a position within said spinner with said unit coaxial with said spinner.

References Cited in the file of this patent

UNITED STATES PATENTS

| 712,943 | Lee et al. | Nov. 4, 1902 |
| 722,615 | Owens | Mar. 10, 1903 |
| 739,854 | Gest | Sept. 29, 1903 |
| 814,022 | Collins | Mar. 6, 1906 |
| 858,502 | Dougherty et al. | July 2, 1907 |
| 954,831 | Underwood | Apr. 12, 1910 |
| 977,345 | Tidman | Nov. 29, 1910 |
| 1,199,997 | Lienesch | Oct. 3, 1916 |
| 1,303,889 | Gruenfeld | May 20, 1919 |
| 1,611,804 | Barkschat | Dec. 21, 1926 |
| 1,658,922 | Heath | Feb. 14, 1928 |
| 1,794,503 | Underwood | Mar. 3, 1931 |
| 1,971,088 | Williams | Aug. 21, 1934 |
| 1,992,739 | Carrington | Feb. 26, 1935 |
| 2,161,968 | Lyons et al. | June 13, 1939 |
| 2,216,896 | Trickey | Oct. 8, 1940 |
| 2,222,889 | Hume | Nov. 26, 1940 |
| 2,349,213 | Van Niekerk | May 16, 1944 |
| 2,408,149 | Miller et al. | Sept. 24, 1946 |
| 2,440,754 | Nagel | May 4, 1948 |
| 2,471,226 | Maccario | May 24, 1949 |
| 2,474,660 | Fitzpatrick | June 28, 1949 |
| 2,511,761 | Barber et al. | June 13, 1950 |
| 2,517,974 | Chase | Aug. 8, 1950 |
| 2,550,858 | Parret | May 1, 1951 |
| 2,590,478 | Weinberg | Mar. 25, 1952 |
| 2,623,260 | Jobe | Dec. 30, 1952 |
| 2,686,951 | Seaman | Aug. 24, 1954 |

FOREIGN PATENTS

| 256,790 | Germany | Feb. 21, 1913 |
| 578,768 | Germany | June 16, 1933 |
| 849,606 | Germany | Sept. 15, 1952 |
| 555,510 | Great Britain | Aug. 26, 1943 |
| 672,774 | Great Britain | May 28, 1952 |
| 692,354 | Great Britain | June 3, 1953 |